(12) United States Patent
Froebel et al.

(10) Patent No.: US 12,017,383 B2
(45) Date of Patent: Jun. 25, 2024

(54) METHOD AND SYSTEM FOR SEPARATING WASTE POLYURETHANE FOAMS

(71) Applicants: Covestro Deutschland AG, Leverkusen (DE); Recticel Engineered Foams Belgium, Brussels (BE)

(72) Inventors: Sascha Froebel, Düsseldorf (DE); Torsten Heinemann, Leichlingen (DE); Robert Grimm, Leverkusen (DE); Katharina Ander, Graz (AT); Franz Siegl, Neusiedl. b. Güssing (AT); Jan Willems, Brussels (BE); Isabel Verlent, Brussels (BE); Joke De Geeter, Brussels (BE)

(73) Assignees: COVESTRO DEUTSCHLAND AG, Leverkusen (DE); RECTICEL ENGINEERED FOAMS BELGIUM, Brussels (BE)

( * ) Notice: Subject to any disclaimer, the term of this patent is extended or adjusted under 35 U.S.C. 154(b) by 0 days.

(21) Appl. No.: 18/020,840

(22) PCT Filed: Aug. 13, 2021

(86) PCT No.: PCT/EP2021/072578
§ 371 (c)(1),
(2) Date: Feb. 10, 2023

(87) PCT Pub. No.: WO2022/038052
PCT Pub. Date: Feb. 24, 2022

(65) Prior Publication Data
US 2023/0264391 A1 Aug. 24, 2023

(30) Foreign Application Priority Data
Aug. 20, 2020 (EP) .................................... 20191868

(51) Int. Cl.
*B29B 17/02* (2006.01)
*B07C 5/342* (2006.01)
(Continued)

(52) U.S. Cl.
CPC .............. *B29B 17/02* (2013.01); *B07C 5/342* (2013.01); *B29B 2017/0203* (2013.01);
(Continued)

(58) Field of Classification Search
CPC ............ B29B 17/02; B29B 2017/0203; B29B 2017/0279; B07C 5/342; B29K 2075/00; B29K 2105/04
(Continued)

(56) References Cited

U.S. PATENT DOCUMENTS

| 7,799,835 B2 * | 9/2010 | Smith ....................... C08J 11/06 528/480 |
| 11,202,517 B2 * | 12/2021 | Krim ....................... A47C 31/08 |
| 2009/0171591 A1 * | 7/2009 | Timmis .............. G01N 21/3563 356/331 |

FOREIGN PATENT DOCUMENTS

| CN | 106824824 | 6/2017 | |
| CN | 106824824 A * | 6/2017 | ............. B07C 5/342 |

(Continued)

OTHER PUBLICATIONS

International Search Report for International Patent Application No. PCT/EP2021/072578 mailed Nov. 24, 2021.
(Continued)

*Primary Examiner* — Terrell H Matthews
(74) *Attorney, Agent, or Firm* — K&L Gates LLP

(57) ABSTRACT

The invention relates to a method for separating waste polyurethane foams, wherein for each polyurethane sample (1) of a supply stream (2) comprising polyurethane samples (1) from waste at least one respective spectrum (3) is
(Continued)

recorded, wherein the at least one respective spectrum (3) is recorded by near-infrared spectroscopy, wherein each polyurethane sample (1) of the supply stream (2) is classified by a classification algorithm (5), which classification algorithm (5) is based on machine learning, based on the respective at least one spectrum (3) into a respective class (8*a-e*) of at least two classes (8*a-e*), wherein the supply stream (2) comprising polyurethane samples (1) is separated into at least two streams (11*a-e*) according to the classification into the respective class (8*a-e*) and wherein each class (8*a-e*) corresponds to a type of polyurethane. The invention also relates to a system for separating waste polyurethane foams.

20 Claims, 1 Drawing Sheet

(51) Int. Cl.
*B29K 75/00* (2006.01)
*B29K 105/04* (2006.01)

(52) U.S. Cl.
CPC ... *B29B 2017/0279* (2013.01); *B29K 2075/00* (2013.01); *B29K 2105/04* (2013.01)

(58) Field of Classification Search
USPC .............................. 209/576, 577, 580, 582
See application file for complete search history.

(56) References Cited

FOREIGN PATENT DOCUMENTS

| CN | 115989093 A | * | 4/2023 | ............. B07C 5/342 |
| EP | 3656525 A1 | * | 5/2020 | ............. A47C 27/15 |
| EP | 3656525 A1 |   | 5/2020 |  |
| WO | 98/19800 A1 |   | 5/1998 |  |
| WO | WO-9819800 A1 | * | 5/1998 | ............. B07C 5/342 |

OTHER PUBLICATIONS

Written Opinion for International Patent Application No. PCT/EP2021/072578 mailed Nov. 24, 2021.
Scott, et al: "Identification of Plastic Waste Using Spectroscopy and Neural Networks", Polymer Engineering and Science, Brookfield Center, US, vol. 35, No. 12, Jun. 1, 1995 (Jun. 1, 1995), pp. 1011-1015.

* cited by examiner

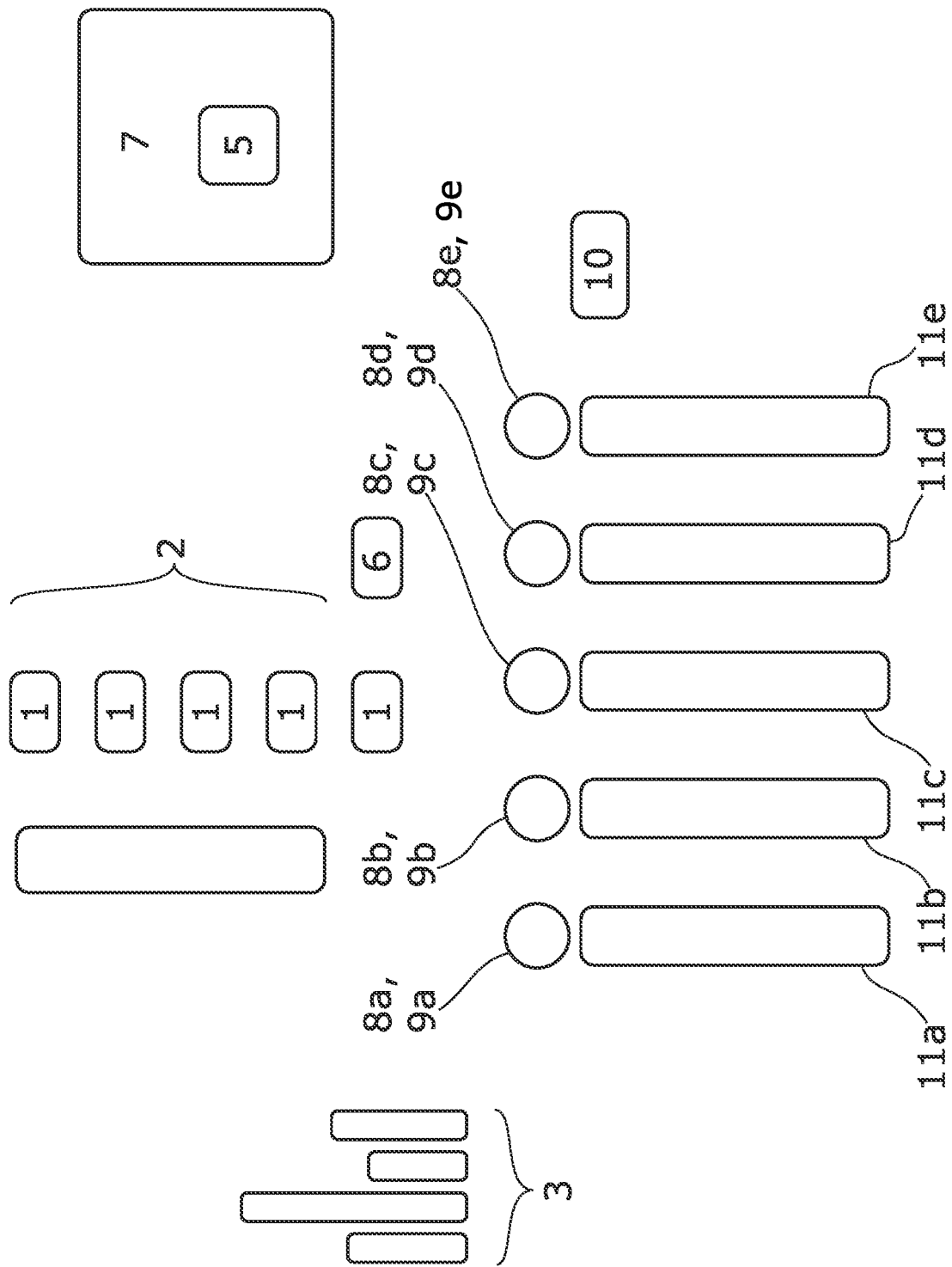

METHOD AND SYSTEM FOR SEPARATING WASTE POLYURETHANE FOAMS

CROSS REFERENCE TO RELATED APPLICATIONS

This application is a U.S. national stage application, filed under 35 U.S.C. § 371, of International Application No. PCT/EP2021/072578, which was filed on Aug. 13, 2021, and which claims priority to European Patent Application No. 20191868.7, which was filed on Aug. 20, 2020. The contents of each are hereby incorporated by reference into this specification.

FIELD

The invention is directed at a method for separating waste polyurethane foams, wherein for each polyurethane sample of a supply stream comprising polyurethane samples from waste at least one respective spectrum is recorded and at a system for separating waste polyurethane foams, the system comprising a spectroscopy apparatus configured to record for each polyurethane sample of a supply stream comprising polyurethane samples from waste at least one respective spectrum.

BACKGROUND

Waste disposal and recycling is an important aspect for the chemical industry and in particular for polyurethane foams. The extensive industrial use of polyurethane materials and the production thereof is accompanied by a considerable accumulation of waste or scrap of these polyurethane materials. A large quantity of polyurethane material scrap is generated during the slabstock manufacturing process. In such operations, from 10% to about 30% of the virgin polyurethane materials may end up as scrap. This scrap polyurethane material may be reused, for instance by grinding it to polyurethane powder and adding this powder as a filler in the polyurethane formulation, or in a rebonding process wherein the waste foam fragments are bonded to each other by means of a binder to produce carpet underlays, pillow fillings or athletic mats.

The largest amount of polyurethane material scrap, however, is constituted by end of life (EoL) polyurethane foam. Currently, more than 30 million mattresses reach their end of life each year, as well as more than 1500 kton of upholstered furniture in the EU. This represents more than 600 kton of polyurethane foam. The main waste processing technologies for this EoL polyurethane foam include incineration and landfill. But besides representing an environmental pollution problem, such disposal techniques have an economic loss associated with both the land required for landfill and the permanent loss of costly materials used in the preparation of polyurethane materials. Therefore, the main interest is to consider the recovery and eventual reuse of such materials.

Chemical depolymerisation of polyurethane materials is well known in the art and may be achieved, amongst other processes, by hydrolysis, hydroalcoholysis, aminolysis and alcoholysis. The alcoholising methods for polyurethane materials known in the art are either mono-phase methods or split-phase methods. In the split-phase method, at least two phases are formed. Most commonly, the upper phase predominantly comprises the recovered polyol compound, which in the best case is similar to the polyol compound used to prepare the polyurethane material. The lower phase can be further purified and chemically treated, e.g. by hydrolysis, to obtain the diamines or polyamines reflecting the diisocyanate or polyisocyanate used to prepare the polyurethane material. These amines can be converted to their respective isocyanate compounds, in order to be reused for producing new polyurethane materials.

When dealing with a mixture of waste polyurethane foams of unknown chemical composition, such as EoL foams or waste from manufacturing and converting processes, it is therefore beneficial to sort and separate these polyurethane foams into different classes, based on the used type of isocyanate and/or based on the used type of polyol. In this way, chemical recycling processes applied on these separated foam classes will yield recovered raw materials with similar properties, so that these can eventually be employed to replace up to 100% of the virgin raw material compounds needed to prepare new polyurethane materials.

European patent application EP 1 522 851 A1 discloses a method by which polymer-containing waste articles such as polyurethane are analyzed prior to recycling with respect to the polymers contained in them during transport wherein a part of the waste article is converted into the gaseous state and mass spectrometry examined by means of a mass spectrometer.

SUMMARY

The object of the invention is to provide an improved method and an improved system for separating waste polyurethane foams into different classes, such that the separated foams can be subjected to chemical recycling processes yielding raw materials that can be used in the synthesis of new polyurethane materials.

With respect to the method for separating waste polyurethane foams with the features of the preamble of claim 1, the object of the invention is achieved by the features of the characterizing part of claim 1. With respect to the system for separating waste polyurethane foam with the features of the preamble of claim 14, the object of the invention is achieved by the features of the characterizing part of claim 14.

The method according to the invention is for separating waste polyurethane foams, wherein for each polyurethane sample of a supply stream comprising polyurethane samples from waste at least one respective spectrum is recorded. Thus, the polyurethane samples are all considered to be waste polyurethane foam. In principle, they may come from any waste polyurethane foam source. The supply stream comprising polyurethane samples may in principle be provided in an arbitrary manner. In particular, the supply stream comprising polyurethane samples may be provided by a conveying apparatus for providing the supply stream comprising polyurethane samples.

The method according to the invention is characterized in that the at least one respective spectrum is recorded by near-infrared spectroscopy. In the context of the present invention, near-infrared spectroscopy is in a region of the electromagnetic spectrum between 750 nm and 3500 nm. The at least one respective spectrum may be recorded by a near-infrared spectroscopy apparatus.

Moreover, the at least one respective spectrum may in principle be recorded in an arbitrary manner. Preferably, the at least one respective spectrum is recorded by irradiating the respective polyurethane sample by a ray source.

The method of the invention is further characterized in that, each polyurethane sample of the supply stream is classified by a classification algorithm, which classification algorithm is based on machine learning, based on the respective at least one spectrum into a respective class of at least two classes, wherein the supply stream of polyurethane samples is separated into at least two streams according to the classification into the respective class and wherein each class corresponds to a type of polyurethane.

BRIEF DESCRIPTION OF DRAWINGS

FIG. 1 shows a schematic diagram of an embodiment of a system according to the invention to perform an embodiment of the method according to the invention.

DETAILED DESCRIPTION

Both the method and the system can also be used to separate polyurethane foams from other materials. In other words, there may also be samples of other materials among the polyurethane samples of the supply stream which are separated into different respective categories. These other materials can be of any type, including textiles, paper, latex, other polymers or an altogether different kind of materials.

The classification algorithm may be any type of algorithm that is based on machine learning. In principle, this may comprise or consist of any kind of machine learning. Thus, based on an analysis of the at least one spectrum recorded for the particular polyurethane sample, that polyurethane sample is classified into a class and separated into a corresponding stream. The criteria for classifying each polyurethane sample into one of the classes may in principle be arbitrary. Preferably, classifying the polyurethane sample into a class is based on a material composition of the polyurethane sample.

Of those classes, there are at least two. The number of streams corresponds to the number of classes. Therefore, there are also at least two streams.

A preferred embodiment of the method according to the invention is characterized in that at least one of the at least one respective spectrum is recorded in reflection mode.

In principle, the at least one respective spectrum may be recorded with an arbitrary spatial resolution. It is preferred that the at least one respective spectrum is recorded with a spatial resolution of less than 5 cm. In particular, the at least one respective spectrum may be recorded with a spatial resolution of less than 1.5 cm.

A further preferred embodiment of the method according to the invention is characterized in that the at least one respective spectrum is recorded in a spectral range between 750 nm and 3500 nm. In particular, it is preferred that the at least one respective spectrum extends in the range between 900 nm and 2500 nm. In other words, at least a part of the at least one respective spectrum is in the range between 900 nm and 2500 nm. That is to say, the at least one respective spectrum has a component between 900 nm and 2500 nm. It may also be that the at least one respective spectrum extends in the range between 900 nm and 1700 nm In principle, the at least one respective spectrum may be recorded at an arbitrary recording rate. Preferably, the at least one respective spectrum is recorded at a recording rate greater than 10 Hz. In particular, the at least one respective spectrum may be recorded at a recording rate greater than 200 Hz. Further preferably, the at least one respective spectrum is recorded at a recording rate within a range of 300 to 600 Hz.

According to a preferred embodiment of the method of the invention, a respective average diameter of the polyurethane samples of the supply stream in at least two orthogonal dimensions is between 0.1 cm and 50 cm. Preferably, a respective average diameter of the polyurethane samples of the supply stream in at least two orthogonal dimensions is between 3 cm and 15 cm. The expression diameter here refers to the length or extent of the polymer sample in the corresponding dimension. The spatial dimensions here are orthogonal in the sense that they are orthogonal with respect to each other.

In a preferred embodiment of the method according to the invention, at least five respective distinct spectra are recorded for each polyurethane sample. Preferably, the at least five respective spectra are distinct in that their respective spatial resolution is offset with respect to each other. In other words, each respective spectrum provides information about a part of the polyurethane sample that is not provided by any of the other respective spectra of that polyurethane sample.

A further preferred embodiment of the method according to the invention is characterized in that the supply stream comprising polyurethane samples is transported by a supply conveying device, that separating the supply stream comprising polyurethane samples into the at least two streams comprises transporting each polyurethane sample of at least one stream by a respective dedicated conveying apparatus for that stream and that each dedicated conveying apparatus transports the respective stream to a respective conveying location. It may be that for more than one stream such a dedicated primary conveying apparatus is used. In other words, in this case the streams are also physically separated and transported further to a respective different destination. It may also be that separating the supply stream comprising polyurethane samples into the at least two streams comprises sorting out each polyurethane sample of at least one further primary stream into a collection container. In other words, the polyurethane samples of the at least one stream are transported to separate conveying locations while the polyurethane samples of the at least one further stream are sorted out into a collection container. The polyurethane samples sorted out then do not need to be processed further.

According to a preferred embodiment of the method according to the invention, the at least two classes comprise at least one MDI class and at least one TDI class, wherein each polyurethane sample of the supply stream is classified into the at least one MDI class when the classification algorithm identifies that polyurethane sample as comprising chemical products of monomeric and/or polymeric methylene diphenyl diisocyanates and wherein each polyurethane sample of the supply stream is classified into the at least one TDI class when the classification algorithm identifies that polyurethane sample as comprising chemical products of toluene diisocyanates. Monomeric and/or polymeric methylene diphenyl diisocyanates are denoted also as MDI. Toluene diisocyanates are also denoted as TDI. In other words, the separation occurs according to the type of isocyanate used for the production of the respective polyurethane sample.

According to a further preferred embodiment of the method of the invention, the at least one TDI class comprises at least two TDI classes. It is further preferred that each polyurethane sample of the supply stream is classified into one of the at least two TDI classes based on the relative proportion of the 2,4- and the 2,6 toluene diisocyanate isomers identified by the classification algorithm used for the production of that respective polyurethane sample. Thus, the classification and then separation is based on the mixing proportions of the toluene diisocyanate isomers that were used in the production of the polyurethane sample to be classified. Commercial mixtures of the 2,4- and 2,6-isomers of toluene diisocyanate which comprise a ratio of 80/20 of said respective isomers may be denoted as T80. Commercial mixtures of the 2,4- and 2,6-isomers of toluene diisocyanate which comprise a ratio of 65/35 of said respective isomers may be denoted as T65.

There may also be additional factors that determine how the polyurethane sample is classified. Typically, polyurethane foams are created by the reaction of a polyol component with an isocyanate, in the presence of a blowing agent, catalysts and other additives. In principle, any component of the polyurethane foam can be used to classify the foam. For example, polyurethane foams can be classified according to whether or not a particular flame retardant, such as Melamine or TCPP, was used when synthesizing the foam. It is also possible to classify foams according to whether or not certain toxic additives were used during synthesis.

When synthesizing polyurethane foams, different types of polyol or mixtures of polyols can be used. Types of polyol are for instance polyether polyols, which can be further distinguished by a.o. their functionality, hydroxyl number, reactivity. The properties of the obtained polyurethane foam can be steered by a proper selection of the type of isocyanate component and the type of polyol. Flexible polyurethane foams, which are generally used for comfort applications, typically fall into one of the following foam classes: conventional foams, high-resilience foams, and viscoelastic foams. These categories mainly differ in the mechanical properties of the foams, such as resilience and indentation hardness. A preferred embodiment of the method according to the invention is characterized in that each polyurethane sample of the supply stream is classified into one of the at least two TDI classes based on a type of polyol mixture identified by the classification algorithm used for the production of that respective polyurethane sample. Thus the classification at least also takes into account the type of polyol mixture that was used to create the polyurethane in the polyurethane sample.

A preferred embodiment of the method according to the invention is characterized in that the at least two TDI classes comprise a high-resilience TDI class and/or a viscoelastic TDI class. In other words, the classification algorithm has at least these two sub-classes with respect to the TDI to classify the polyurethane sample. Here it is further preferred that each polyurethane sample of the supply stream is classified into the high-resilience TDI class when the classification algorithm identifies that polyurethane sample as comprising high-resilience polyurethane foam. High-resilience polyurethane foams are created using polyols with mostly primary OH groups, with an OH number between 27 and 35.

It is also preferred that each polyurethane sample of the supply stream is classified into the viscoelastic TDI class when the classification algorithm identifies that polyurethane sample as comprising viscoelastic polyurethane foam. Viscoelastic polyurethane foams are created using complex polyols mixtures, with and OH number between 100 and 200 KOH/g.

A further preferred embodiment of the method according to the invention is characterized in that the at least two TDI classes comprise a conventional TDI class and/or an other TDI class. In other words, the classification algorithm has at least these two TDI sub-classes to classify the polyurethane sample. The other TDI class may be a default class which may be used for any polyurethane samples that comprises chemical products of toluene diisocyanates but which is not classified into any of the other TDI sub-classes. A further preferred embodiment of the method according to the invention is characterized in that each polyurethane sample of the supply stream is classified into the conventional TDI class when the classification algorithm identifies that polyurethane sample as comprising conventional polyurethane foam. Conventional polyurethane foams are created using polyols with predominantly secondary OH groups, with an OH number between 42 and 56 mg KOH/g. It is preferred that each polyurethane sample of the supply stream is classified into the other TDI class when the classification algorithm fails to classify that polyurethane sample into the high-resilience TDI class, the viscoelastic TDI class or the conventional TDI class.

In principle, the classification algorithm may be based on any kind of machine learning. According to a preferred embodiment of the method of the invention, the classification algorithm is trained by supervised learning.

According to a further preferred embodiment of the method of the invention, the type of classification algorithm may be a partial least squares regression, a logistic regression, a k-nearest neighbors algorithm, an adaptive boosting algorithm, a gradient boosting algorithm, a random forest algorithm or an artificial neural network algorithm.

A preferred embodiment of the method of the invention is characterized in that the classification algorithm employs a distance metric, an independent component analysis, and/or a principal component analysis.

A further preferred embodiment of the method of the invention is characterized in that the classification algorithm is trained with a set of reference spectra of respective reference polyurethane samples. Preferably each respective reference polyurethane sample has an a priori known material composition. It may be that for each reference polyurethane sample more than one reference spectrum is present in the set of reference spectra.

According to a preferred embodiment of the method of the invention, each reference spectrum of the set of reference spectra is recorded by spectroscopy from a respective reference polyurethane sample. In principle, any kind of pre-processing may be applied when the reference spectra are recorded. It is preferred that the recording of each reference spectrum of the set of reference spectra comprises calculating a derivative of the spectrum, selecting a region of interest (ROI), applying a filter to the spectrum and/or normalizing the spectrum.

According to a further preferred embodiment of the method according to the invention, wherein at least one of the at least two streams is chemically recycled.

Here it is further preferred that the recycling formulation for the chemical recycling for the at least one of the at least two streams is based on the respective class corresponding to the respective stream.

The system according to the invention is for separating waste polyurethane foams. The system according to the invention comprises a spectroscopy apparatus configured to record for each polyurethane sample of a supply stream comprising polyurethane samples from waste at least one respective spectrum.

The system according to the invention further comprises a computing arrangement on which a classification algorithm based on machine learning and configured to classify each polyurethane sample of the supply stream into a respective class of at least two classes is executed, which classification is based on the respective at least one spectrum.

The system according to the invention further comprises a separating apparatus for separating the supply stream comprising polyurethane samples into at least two streams according to the classification into the respective class, wherein each class corresponds to a type of polyurethane.

Preferred embodiments, features and advantages of the system according to the invention correspond to those of the method according to the invention and vice versa.

As shown in FIG. 1, waste polyurethane foams are provided by a supply stream 2 of polyurethane samples 1. The polyurethane samples 1 have been collected for recycling and are understood to vary in composition. In particular, a supply conveying device 4, which is here a first conveyor belt, provides the supply stream 2.

A spectroscopy apparatus 6 uses near infrared spectroscopy and records for each polyurethane sample 1 a spectrum 3 associated with that polyurethane sample 1. That spectrum 3 then undergoes the pre-processing. In FIG. 1, only a single such spectrum 3 is shown.

In the following separation step, each polyurethane sample 1 is classified by a classification algorithm 5 based on the recorded spectrum 3 of that polyurethane sample 1. The classification algorithm 5 has been trained by machine learning. In particular, the classification algorithm 5 is a k-nearest neighbor classifier that has been trained with reference spectra from a number of reference polyurethane samples with known material compositions.

The classification algorithm 5 serves to distinguish polyurethane samples 1 with chemical products of monomeric and/or polymeric methylene diphenyl diisocyanates (MDI) from those with chemical products of toluene diisocyanates (TDI). The classification algorithm 5 is executed on a computing arrangement 7.

The classification algorithm 5 classifies each polyurethane sample 1 into one of the following classes 8a-e: the MDI class 9a, the high-resilience TDI class 9b, the viscoelastic TDI class 9c, the conventional TDI class 9d and the other TDI class 9e.

Any polyurethane sample 1 is classified into the MDI class 9a when the classification algorithm 5 determines that that polyurethane sample 1 was produced using monomeric or polymeric methylene diphenyl diisocyanates. A polyurethane sample 1 is classified into the high-resilience TDI class 9b when the classification algorithm 5 determines that that polyurethane sample 1 was produced using toluene diisocyanates and using polyols typically used for synthesizing high-resilience polyurethane foams. A polyurethane sample 1 is classified into the viscoelastic TDI class 9c when the classification algorithm 5 determines that that polyurethane sample 1 was produced using toluene diisocyanates and using polyols typically used for synthesizing viscoelastic polyurethane foams. A polyurethane sample 1 is classified into the conventional TDI class 9d when the classification algorithm 5 determines that that polyurethane sample 1 was produced using toluene diisocyanates and using polyols typically used for synthesizing conventional polyols. Any other polyurethane sample 1 is classified into the other TDI class 9e by the classification algorithm 5.

A separating apparatus 10 then separates the polyurethane sample 1 into the respective stream 11a-e that corresponds to the class.

What is claimed is:

1. A method for separating waste polyurethane foams, the method comprising recording at least one respective spectrum for each polyurethane sample of a supply stream comprising polyurethane samples from waste, wherein the at least one respective spectrum is recorded by near-infrared spectroscopy, wherein each polyurethane sample of the supply stream is classified by a classification algorithm, wherein the classification algorithm is based on machine learning, based on the respective at least one spectrum into a respective class of at least two classes, wherein the supply stream comprising polyurethane samples is separated into at least two streams according to the classification into the respective class, wherein at least one of the at least two streams is chemically recycled, and wherein each class corresponds to a type of polyurethane.

2. The method according to claim 1, wherein at least one of the at least one respective spectrum is recorded in reflection mode.

3. The method according to claim 1, wherein the at least one respective spectrum is recorded in a spectral range between 750 nm and 3500 nm.

4. The method according to claim 1, wherein a respective average diameter of the polyurethane samples of the supply stream in at least two orthogonal dimensions is between 0.1 cm and 50 cm.

5. The method according to claim 1, wherein the at least two classes comprise at least one MDI class and at least one TDI class, wherein each polyurethane sample of the supply stream is classified into the at least one MDI class when the classification algorithm identifies that polyurethane sample as comprising chemical products of monomeric and/or polymeric methylene diphenyl diisocyanates and that each polyurethane sample of the supply stream is classified into the at least one TDI class when the classification algorithm identifies that polyurethane sample as comprising chemical products of toluene diisocyanates.

6. The method according to claim 5, wherein the at least one TDI class comprises at least two TDI classes.

7. The method according to claim 6, wherein each polyurethane sample of the supply stream is classified into one of the at least two TDI classes based on a type of polyol mixture identified by the classification algorithm used for the production of that respective polyurethane sample.

8. The method according to claim 6, wherein the at least two TDI classes comprise a high-resilience TDI class and/or a viscoelastic TDI class.

9. The method according to claim 6, wherein the at least two TDI classes comprise a conventional TDI class and/or an other TDI class.

10. The method according to claim 1, wherein the type of classification algorithm is a partial least squares regression, a logistic regression, a k-nearest neighbor algorithm, an adaptive boosting algorithm, a gradient boosting algorithm, a random forest algorithm or an artificial neural network algorithm.

11. The method according to claim 1, wherein the classification algorithm employs a distance metric, an independent component analysis, a principal component analysis, or any combination thereof.

12. The method according to claim 1, wherein the classification algorithm is trained with a set of reference spectra of respective reference polyurethane samples.

13. The method according to claim 12, wherein each reference spectrum of the set of reference spectra is recorded by spectroscopy from a respective reference polyurethane sample.

14. A system for separating waste polyurethane foams, the system comprising a spectroscopy apparatus configured to record for each polyurethane sample of a supply stream comprising polyurethane samples from waste at least one respective spectrum, wherein the system further comprises a computing arrangement on which a classification algorithm based on machine learning and configured to classify each polyurethane sample of the supply stream into a respective class of at least two classes is executed, which classification is based on the respective at least one spectrum, the system further comprising a separating apparatus for separating the supply stream comprising polyurethane samples into at least two streams according to the classification into the respective class, wherein each class corresponds to a type of polyurethane, wherein the system further comprises a recycling module for chemically recycling at least one of the at least two streams.

15. The method according to claim 2, wherein at least one of the at least one respective spectrum is recorded with a spatial resolution of less than 5 cm.

16. The method according to claim 15, wherein at least one of the at least one respective spectrum is recorded with a spatial resolution of less than 1.5 cm.

17. The method according to claim 3, wherein the at least one respective spectrum is recorded in a spectral range between 900 nm and 2500 nm.

18. The method according to claim 3, wherein the at least one respective spectrum is recorded at a recording rate greater than 10 Hz.

19. The method according to claim 18, wherein the at least one respective spectrum is recorded at a recording rate in the range of 300 to 600 Hz.

20. The method according to claim 4, wherein a respective average diameter of the polyurethane samples of the supply stream in at least two orthogonal dimensions is between 3 cm and 15 cm.

* * * * *